(12) United States Patent
Hiroi

(10) Patent No.: US 11,867,870 B2
(45) Date of Patent: Jan. 9, 2024

(54) FOG DETERMINATION APPARATUS, FOG DETERMINATION METHOD, AND COMPUTER READABLE MEDIUM

(71) Applicant: Mitsubishi Electric Corporation, Tokyo (JP)

(72) Inventor: Kimihiko Hiroi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 743 days.

(21) Appl. No.: 16/978,569

(22) PCT Filed: Mar. 12, 2018

(86) PCT No.: PCT/JP2018/009396
§ 371 (c)(1),
(2) Date: Sep. 4, 2020

(87) PCT Pub. No.: WO2019/175920
PCT Pub. Date: Sep. 19, 2019

(65) Prior Publication Data
US 2021/0019537 A1    Jan. 21, 2021

(51) Int. Cl.
| G01S 17/95 | (2006.01) |
| G01S 17/86 | (2020.01) |
| G06V 10/60 | (2022.01) |
| G01W 1/02 | (2006.01) |
| G06V 20/58 | (2022.01) |

(52) U.S. Cl.
CPC .............. *G01W 1/02* (2013.01); *G01S 17/86* (2020.01); *G01S 17/95* (2013.01); *G06V 10/60* (2022.01); *G06V 20/58* (2022.01)

(58) Field of Classification Search
CPC .......... G01W 1/02; G01S 17/86; G01S 17/95; G01S 7/4802; G01S 17/89; G01S 17/931; G06V 10/60; G06V 20/58; Y02A 90/10
See application file for complete search history.

(56) References Cited

U.S. PATENT DOCUMENTS

| 8,473,144 B1 | 6/2013 | Dolgov et al. |
| 10,254,388 B2 * | 4/2019 | LaChapelle ............. G01S 17/42 |

(Continued)

FOREIGN PATENT DOCUMENTS

| JP | 5-296766 A | 11/1993 |
| JP | 2000-329852 A | 11/2000 |

(Continued)

OTHER PUBLICATIONS

International Search Report issued in PCT/JP2018/009396 (PCT/ISA/210), dated May 29, 2018.

(Continued)

*Primary Examiner* — Siamak Harandi
(74) *Attorney, Agent, or Firm* — Birch, Stewart, Kolasch & Birch, LLP

(57) ABSTRACT

A point data acquisition unit acquires point data indicating a reflection point obtained by an optical sensor that receives reflected light of an emitted light beam reflected at the reflection point. An image data acquisition unit acquires image data of an area around the reflection point indicated by the point data. A luminance calculation unit calculates smoothness of luminance of the image data. A fog determination unit determines the density of fog based on a distance, which is determined from the point data, from the optical sensor to the reflection point and the smoothness of the luminance.

10 Claims, 15 Drawing Sheets

(56) References Cited

U.S. PATENT DOCUMENTS

| | | | |
|---|---|---|---|
| 2003/0222983 A1 | 12/2003 | Nobori et al. | |
| 2004/0054473 A1 | 3/2004 | Shimomura | |
| 2008/0007429 A1 | 1/2008 | Kawasaki et al. | |
| 2013/0039544 A1* | 2/2013 | Robert | B60S 1/0844 382/104 |
| 2013/0342692 A1* | 12/2013 | Li | G01N 21/538 348/143 |
| 2014/0067187 A1 | 3/2014 | Ferguson et al. | |
| 2014/0121880 A1 | 5/2014 | Dolgov et al. | |
| 2014/0297094 A1 | 10/2014 | Dolgov et al. | |
| 2016/0349358 A1 | 12/2016 | Noda | |
| 2017/0154409 A1 | 6/2017 | Murakami et al. | |

FOREIGN PATENT DOCUMENTS

| | | |
|---|---|---|
| JP | 2004-56778 A | 2/2004 |
| JP | 2004-112144 A | 4/2004 |
| JP | 2006-227876 A | 8/2006 |
| JP | 2008-33872 A | 2/2008 |
| JP | 2009-42177 A | 2/2009 |
| JP | 2009-177311 A | 8/2009 |
| JP | 2010-15436 A | 1/2010 |
| JP | 2010-97430 A | 4/2010 |
| JP | 2013-192003 A | 9/2013 |
| JP | 2014-89691 A | 5/2014 |
| JP | 2016-223872 A | 12/2016 |
| JP | 2017-97906 A | 6/2017 |
| JP | 2017-102245 A | 6/2017 |

OTHER PUBLICATIONS

Mori et al., "Fog density judgment by in-vehicle camera images and millimeter-wave radar data", The Institute of Electronics, Information and Communication Engineers, IEICE Technical Report, 106 (605), Mar. 15, 2007, pp. 85-90.

* cited by examiner

FOG DETERMINATION APPARATUS, FOG DETERMINATION METHOD, AND COMPUTER READABLE MEDIUM

TECHNICAL FIELD

The present invention relates to a technology to determine the density of fog.

BACKGROUND ART

Patent Literature 1 describes a technology to decide whether fog is present around a vehicle.

In Patent Literature 1, when illuminating light is emitted by headlights, a decision as to whether fog is present is made based on a difference in luminosity of an area not illuminated by the illuminating light in an image captured of an area in front of the vehicle. Specifically, when no fog is present, the luminosity of the area not illuminated by the illuminating light is low. In contrast, when fog is present, the illuminating light is reflected by fog particles, so that the luminosity gradually increases from the center to the periphery of the image. In Patent Literature 1, this characteristic is used to decide whether fog is present.

CITATION LIST

Patent Literature

Patent Literature 1: JP 2008-033872 A

SUMMARY OF INVENTION

Technical Problem

In the technology described in Patent Literature 1, illumination from headlights is a prerequisite, so that a decision as to whether fog is present cannot be made without a certain level of darkness.

It is an object of the present invention to allow the density of fog to be determined regardless of the presence or absence of illumination from headlights.

Solution to Problem

A fog determination apparatus according to the present invention includes
  a point data acquisition unit to acquire point data indicating a reflection point obtained by an optical sensor that receives reflected light of an emitted light beam reflected at the reflection point;
  an image data acquisition unit to acquire image data of an area around the reflection point indicated by the point data acquired by the point data acquisition unit;
  a luminance calculation unit to calculate smoothness of luminance of the image data acquired by the image data acquisition unit; and
  a fog determination unit to determine a density of fog based on a distance, which is determined from the point data, from the optical sensor to the reflection point and the smoothness of the luminance calculated by the luminance calculation unit.

Advantageous Effects of Invention

In the present invention, the density of fog is determined based on a distance determined from point data obtained by an optical sensor, and on smoothness of luminance of image data. Therefore, the density of fog can be determined regardless of the presence or absence of illumination from headlights.

DESCRIPTION OF EMBODIMENTS

First Embodiment

*Description of Configuration*

Figure 1:
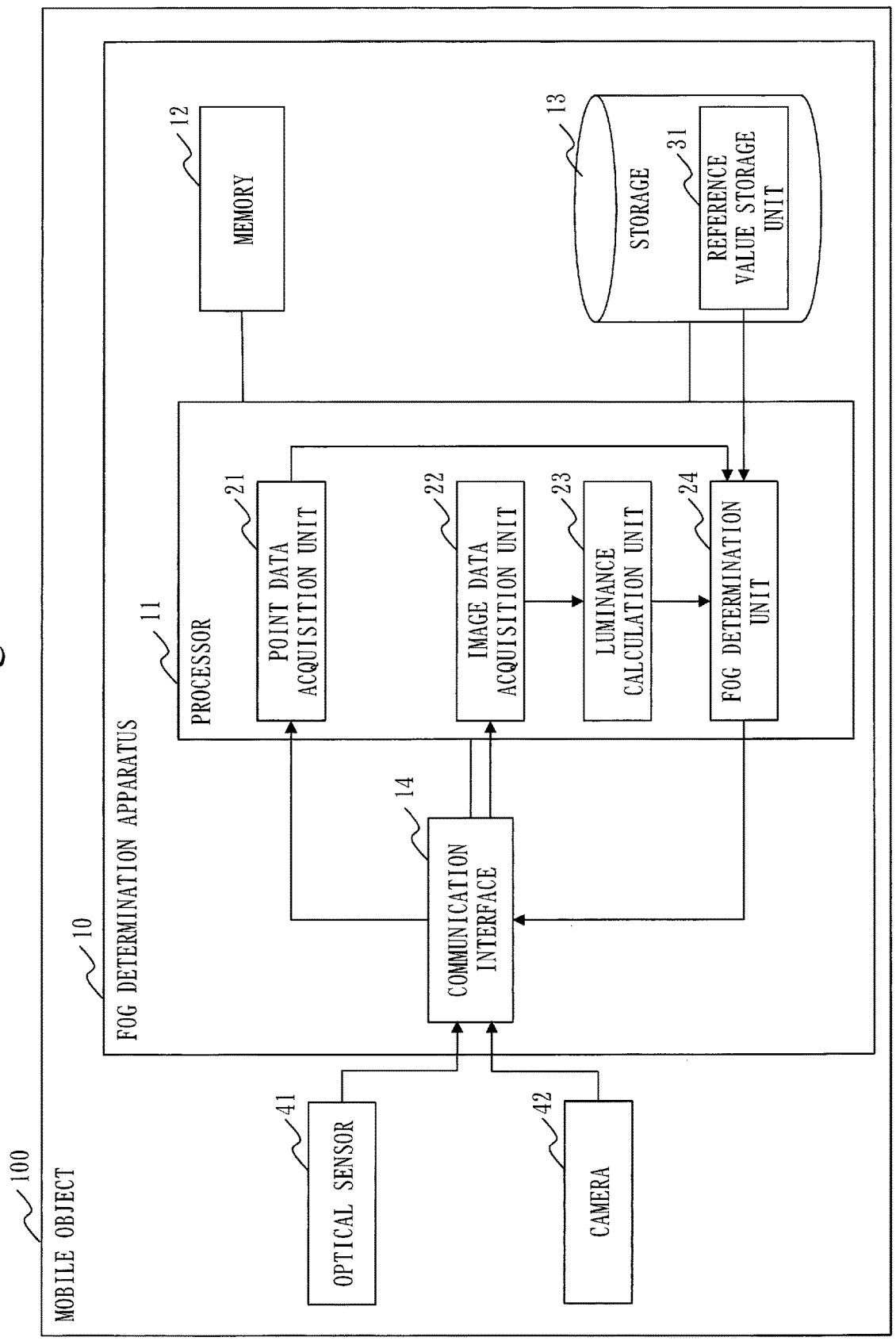
FIG. 1 is a configuration diagram of a fog determination apparatus 10 according to a first embodiment.

Referring to FIG. 1, a configuration of a fog determination apparatus 10 according to a first embodiment will be described.

The fog determination apparatus 10 is a computer, such as an electronic control unit (ECU), to be mounted on a mobile object 100.

In the first embodiment, the mobile object 100 is a vehicle. However, the mobile object 100 is not limited to the vehicle, and may be other types such as a ship or an airplane. The fog determination apparatus 10 may be implemented in a form integrated with or a form inseparable from the mobile object 100 or another component illustrated in the drawing, or may be implemented in a form detachable from or a form separable from the mobile object 100 or another component illustrated in the drawing.

The fog determination apparatus 10 includes hardware of a processor 11, a memory 12, a storage 13, and a communication interface 14. The processor 11 is connected with other hardware components via signal lines and controls the other hardware components.

The processor 11 is an integrated circuit (IC) that performs processing. Specific examples of the processor 11 are a central processing unit (CPU), a digital signal processor (DSP), and a graphics processing unit (GPU).

The memory 12 is a storage device to temporarily store data. Specific examples of the memory 12 are a static random access memory (SRAM) and a dynamic random access memory (DRAM).

The storage 13 is a storage device to store data. A specific example of the storage 13 is a hard disk drive (HDD). Alternatively, the storage 13 may be a portable recording medium, such as a Secure Digital (SD, registered trademark) memory card, CompactFlash (CF, registered trademark), a NAND flash, a flexible disk, an optical disc, a compact disc, a Blu-ray (registered trademark) disc, or a digital versatile disc (DVD).

The communication interface 14 is an interface for communication with external devices. Specific examples of the communication interface 14 are an Ethernet (registered trademark) port, a Universal Serial Bus (USB) port, and a High-Definition Multimedia Interface (HDMI, registered trademark) port.

The communication interface 14 is connected with an optical sensor 41 and a camera 42 that are mounted on the mobile object 100.

The optical sensor 41 is a device that emits a light beam, which is a beam of light, and receives reflected light of the emitted light beam reflected at a reflection point. A specific example of the optical sensor 41 is a LiDAR (Light Detection and Ranging). In the first embodiment, it is assumed that the optical sensor 41 emits a light beam forward in a direction of movement of the mobile object 100.

The camera 42 is a device that captures an image of an area around the mobile object 100 and generates image data. In the first embodiment, it is assumed that the camera 42 captures an image of an area forward in the direction of movement of the mobile object 100.

The fog determination apparatus 10 includes, as functional components, a point data acquisition unit 21, an image data acquisition unit 22, a luminance calculation unit 23, and a fog determination unit 24. The functions of the functional components of the fog determination apparatus 10 are realized by software.

The storage 13 stores programs for realizing the functions of the functional components of the fog determination apparatus 10. These programs are loaded into the memory 12 by the processor 11 and executed by the processor 11. This realizes the functions of the functional components of the fog determination apparatus 10.

The storage 13 realizes the function of a reference value storage unit 31.

FIG. 1 illustrates only one processor 11. However, a plurality of processors 11 may be included, and the plurality of processors 11 may cooperate to execute the programs for realizing the functions.

*Description of Operation*

Referring to FIGS. 2 to 5, operation of the fog determination apparatus 10 according to the first embodiment will be described.

The operation of the fog determination apparatus 10 according to the first embodiment corresponds to a fog determination method according to the first embodiment. The operation of the fog determination apparatus 10 according to the first embodiment also corresponds to processes of a fog determination program according to the first embodiment.

Figure 2:
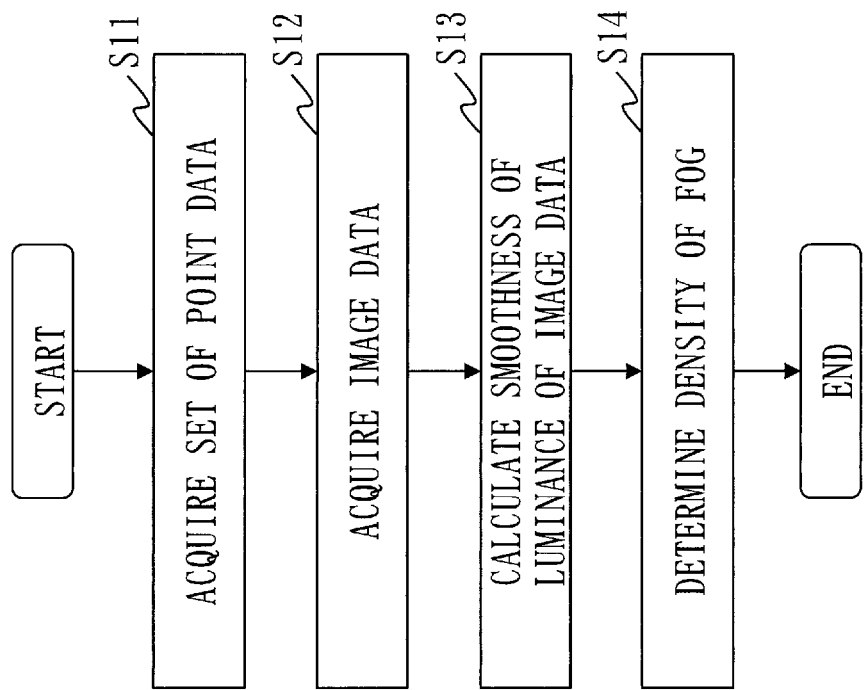
FIG. 2 is a flowchart illustrating overall operation of the fog determination apparatus 10 according to the first embodiment.

Referring to FIG. 2, the overall operation of the fog determination apparatus 10 according to the first embodiment will be described.

(Step S11: Point Data Acquisition Process)

The point data acquisition unit 21 acquires, via the communication interface 14, a set of point data, each piece of point data indicating a reflection point obtained by the optical sensor 41 that receives reflected light of an emitted light beam reflected at the reflection point. The point data acquisition unit 21 writes the acquired set of point data in the memory 12. In the first embodiment, point data indicates a reflection point at which the intensity of reflected light of a given light beam emitted from the optical sensor 41 is greatest.

(Step S12: Image Data Acquisition Process)

The image data acquisition unit 22 acquires image data of an area around the reflection points indicated by the point data included in the set acquired in step S11.

Figure 3:
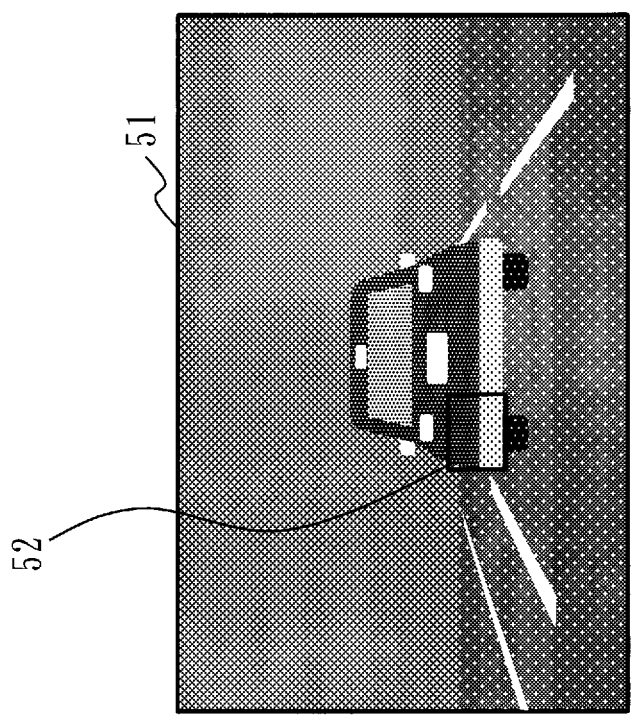
FIG. 3 is a diagram describing an image data acquisition process according to the first embodiment.

Referring to FIG. 3, this will be described specifically. The image data acquisition unit 22 acquires, via the communication interface 14, image data 51 generated by the camera 42. The image data acquisition unit 22 projects the point data included in the set onto the acquired image data 51. The image data acquisition unit 22 cuts out image data 52 of a portion around the projected reflection points. The image data acquisition unit 22 cuts out the image data 52 so that at least a reference number of pixels are included in horizontal and vertical directions. The image data acquisition unit 22 writes the image data 52 that has been cut out in the memory 12.

(Step S13: Luminance Calculation Process)

The luminance calculation unit 23 calculates smoothness of luminance of the image data acquired in step S12.

Figure 4:
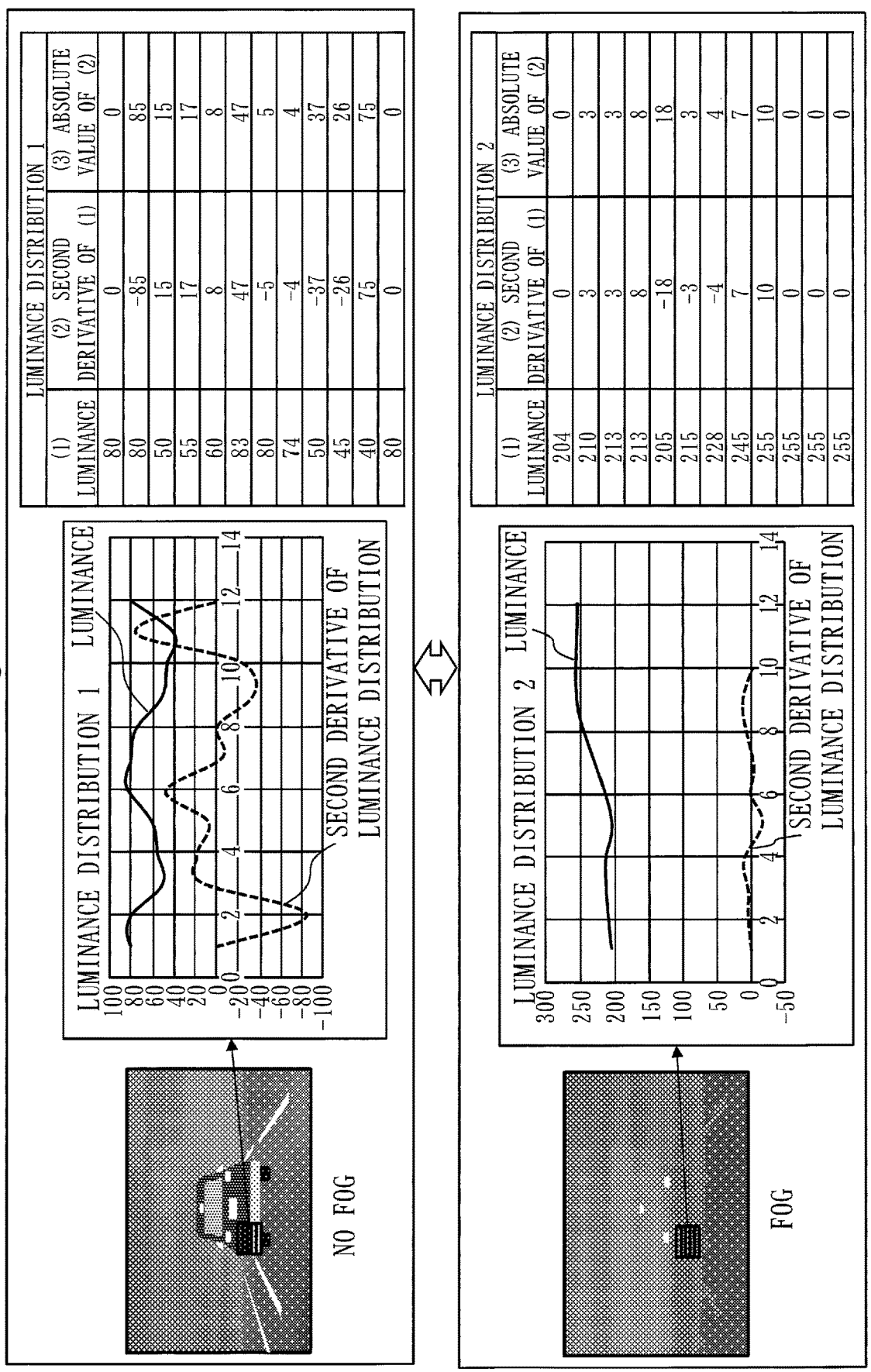
FIG. 4 is a diagram describing a luminance calculation process according to the first embodiment.

Referring to FIG. 4, this will be described specifically. The luminance calculation unit 23 reads the image data from the memory 12. The luminance calculation unit 23 treats each horizontal line of the image data as a target line, performs smoothing on luminance of the pixels of the target line, and then calculates the absolute value of a value obtained by calculating a second derivative of the luminance. Then, the luminance calculation unit 23 calculates, as the smoothness of the luminance of the image data, the sum of the absolute values calculated for each horizontal line of the image data. The luminance calculation unit 23 writes the calculated smoothness of the luminance in the memory 12.

Note that the smaller the sum of the absolute values, the higher the smoothness of the luminance. That is, there is less texture in the image data. As illustrated in FIG. 4, the smoothness of the luminance when fog is present tends to be higher than the smoothness of the luminance when no fog is present.

(Step S14: Fog Determination Process)

The fog determination unit 24 determines the density of fog based on a distance, which is determined from the point data included in the set acquired in step S11, from the optical sensor 41 to each of the reflection points and the smoothness of the luminance calculated in step S13.

Figure 5:
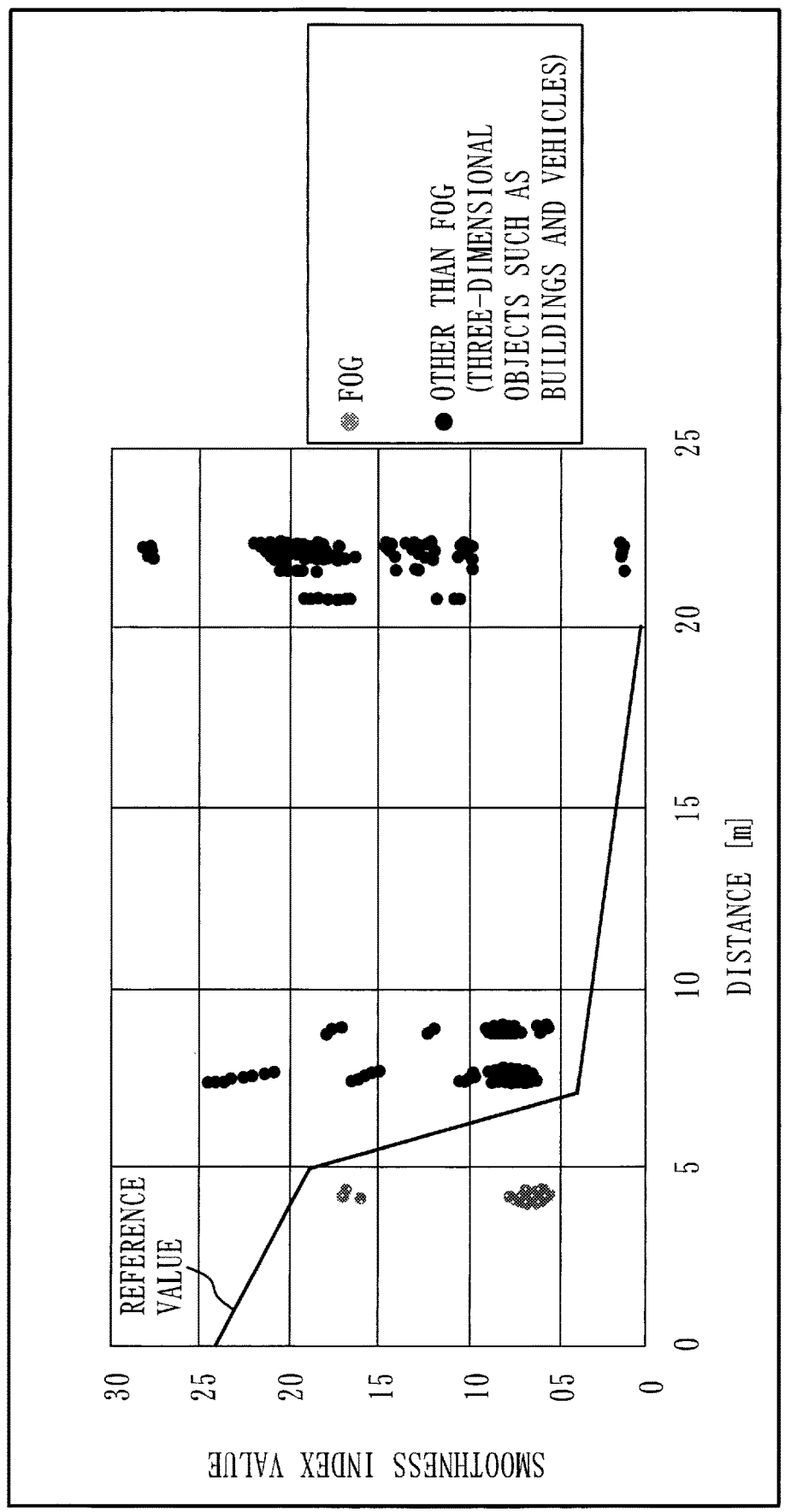
FIG. 5 is a diagram describing information to be stored in a reference value storage unit 31 according to the first embodiment.

Specifically, the fog determination unit 24 refers to reference values stored in the reference value storage unit 31. In the first embodiment, as illustrated in FIG. 5, the reference value storage unit 31 stores the reference values depending on the distance. The fog determination unit 24 compares the reference value corresponding to the distance from the optical sensor 41 to each of the reflection points with the smoothness of the luminance, and decides whether fog with a density greater than or equal to a certain level is present. That is, if the value of the smoothness of the luminance is below the reference value, in other words, if the smoothness is smoother than the smoothness indicated by the reference value, the fog determination unit 24 decides that fog is present. On the other hand, if the value of the smoothness of the luminance is above or equal to the reference value, in other words, if the smoothness is less than or equal to the smoothness indicated by the reference value, the fog determination unit 24 decides that no fog is present.

The shorter the distance, the larger a value stored as the reference value. That is, the shorter the distance from the optical sensor 41 to each of the reflection points, the higher the possibility of decision that fog is present even when the smoothness of the luminance is low. This is because as the distance is longer, the luminance is smoother also for three-dimensional objects such as buildings and vehicles. The reference values depending on the distance may be obtained empirically.

Effects of First Embodiment

As described above, the fog determination apparatus 10 according to the first embodiment determines the density of fog based on the distance to a reflection point and smoothness of luminance of image data around the reflection point. This allows the density of fog to be determined regardless of the presence or absence of illumination from headlights. That is, the density of fog can be determined even in a state with a certain level of lightness, such as in the daytime.

\*\*\*Other Configurations\*\*\*

<First Variation>

In the first embodiment, the fog determination unit 24 decides whether fog with a density greater than or equal to a certain level is present. However, the fog determination unit 24 may determine which level of density of fog, out of a plurality of levels, corresponds to the state around the mobile object 100.

Figure 6:
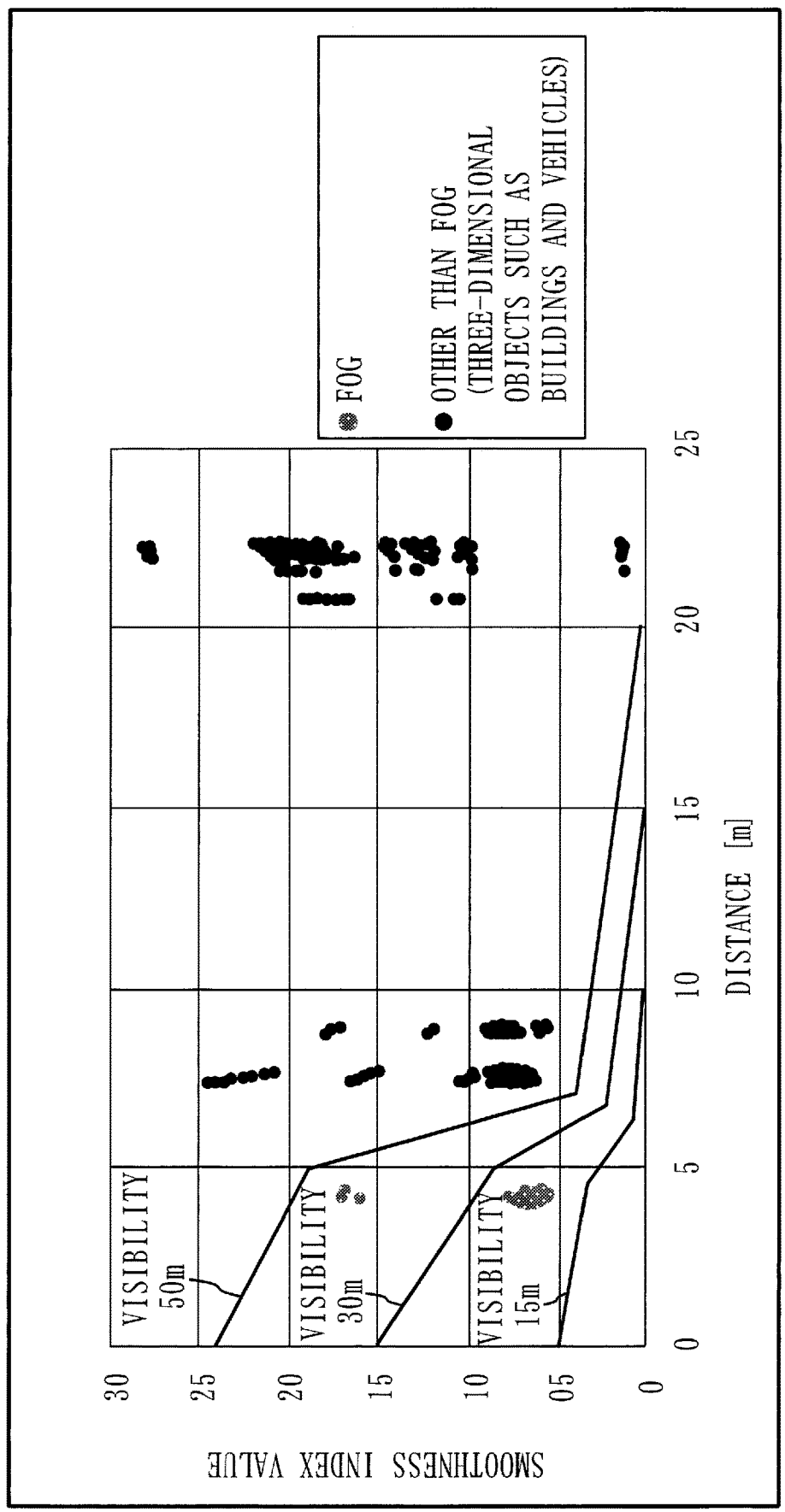
FIG. 6 is a diagram describing information to be stored in the reference value storage unit 31 according to a first variation.

In this case, as illustrated in FIG. 6, the reference value storage unit 31 stores reference values depending on the distance, separately for each level of density of fog. In FIG. 6, the reference values depending on the distance are stored for fog with a visibility of 15 m, fog with a visibility of 30 m, and fog with a visibility of 50 m. The fog determination unit 24 compares the reference values for each level of density of fog that correspond to the distance from the optical sensor 41 to each of the reflection points with the smoothness of the luminance, and determines the density of fog.

Specifically, if the luminance is smoother in comparison with the reference value for fog with a visibility of 15 m, the fog determination unit 24 determines that fog with a visibility of 15 m is present. If the luminance is not smoother in comparison with the reference value for fog with a visibility of 15 m and is smoother in comparison with the reference value for a visibility of 30 m, the fog determination unit 24 determines that fog with a visibility of 30 m is present. If the luminance is not smoother in comparison with the reference value for fog with a visibility of 30 m and is smoother in comparison with the reference value for a visibility of 50 m, the fog determination unit 24 determines that fog with a visibility of 50 m is present. If the luminance is not smoother in comparison with the reference value for fog with a visibility of 50 m, the fog determination unit 24 determines that no fog is present.

The reference value depending on the distance is smaller as the density of fog is greater. That is, the reference value depending on the distance is such that the value indicates higher smoothness as the density of fog is greater.

<Second Variation>

In the first embodiment, the functional components are realized by software. As a second variation, however, the functional components may be realized by hardware. With regard to this second variation, differences from the first embodiment will be described.

Figure 7:
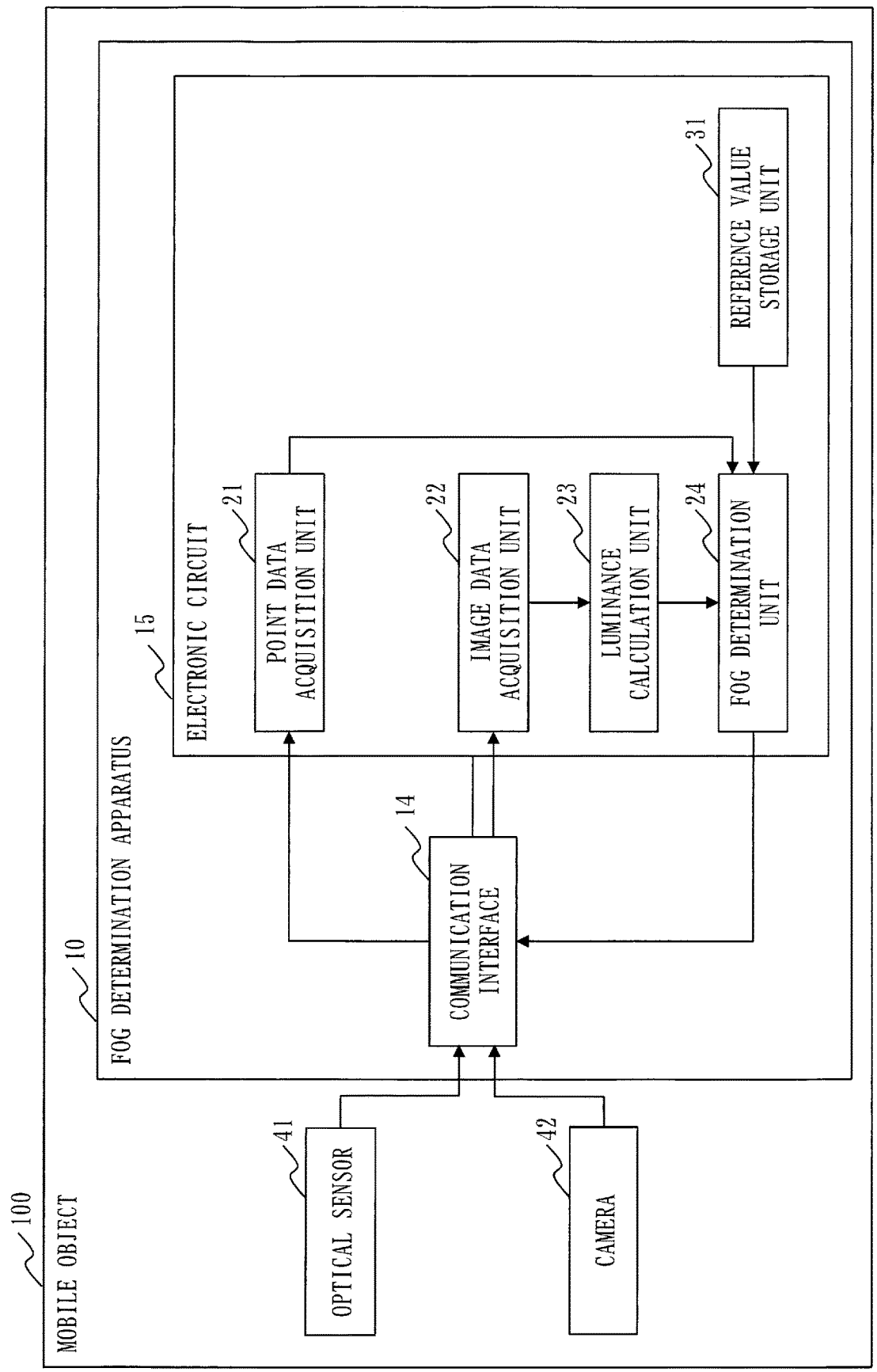
FIG. 7 is a configuration diagram of the fog determination apparatus 10 according to a second variation.

Referring to FIG. 7, a configuration of the fog determination apparatus 10 according to the second variation will be described.

When the functional components are realized by hardware, the fog determination apparatus 10 includes an electronic circuit 15, in place of the processor 11, the memory 12, and the storage 13. The electronic circuit 15 is a dedicated circuit that realizes the functions of the functional components, the memory 12, and the storage 13.

The electronic circuit 15 is assumed to be a single circuit, a composite circuit, a programmed processor, a parallel-programmed processor, a logic IC, a gate array (GA), an application specific integrated circuit (ASIC), or a field-programmable gate array (FPGA).

The functional components may be realized by one electronic circuit 15, or the functional components may be distributed among and realized by a plurality of electronic circuits 15.

<Third Variation>

As a third variation, some of the functional components may be realized by hardware, and the rest of the functional components may be realized by software.

Each of the processor 11, the memory 12, the storage 13, and the electronic circuit 15 is referred to as processing circuitry. That is, the functions of the functional components are realized by the processing circuitry.

<Fourth Variation>

In the first embodiment, the fog determination apparatus 10 is realized by one computer such as an ECU. However, the fog determination apparatus 10 may be realized by a plurality of computers such as ECUs.

Second Embodiment

A second embodiment differs from the first embodiment in that a sensor threshold value of a sensor for identifying an obstacle is set depending on the density of fog that has been determined. In the second embodiment, this difference will be described, and description of the same portions will be omitted.

\*\*\*Description of Configuration\*\*\*

Figure 8:
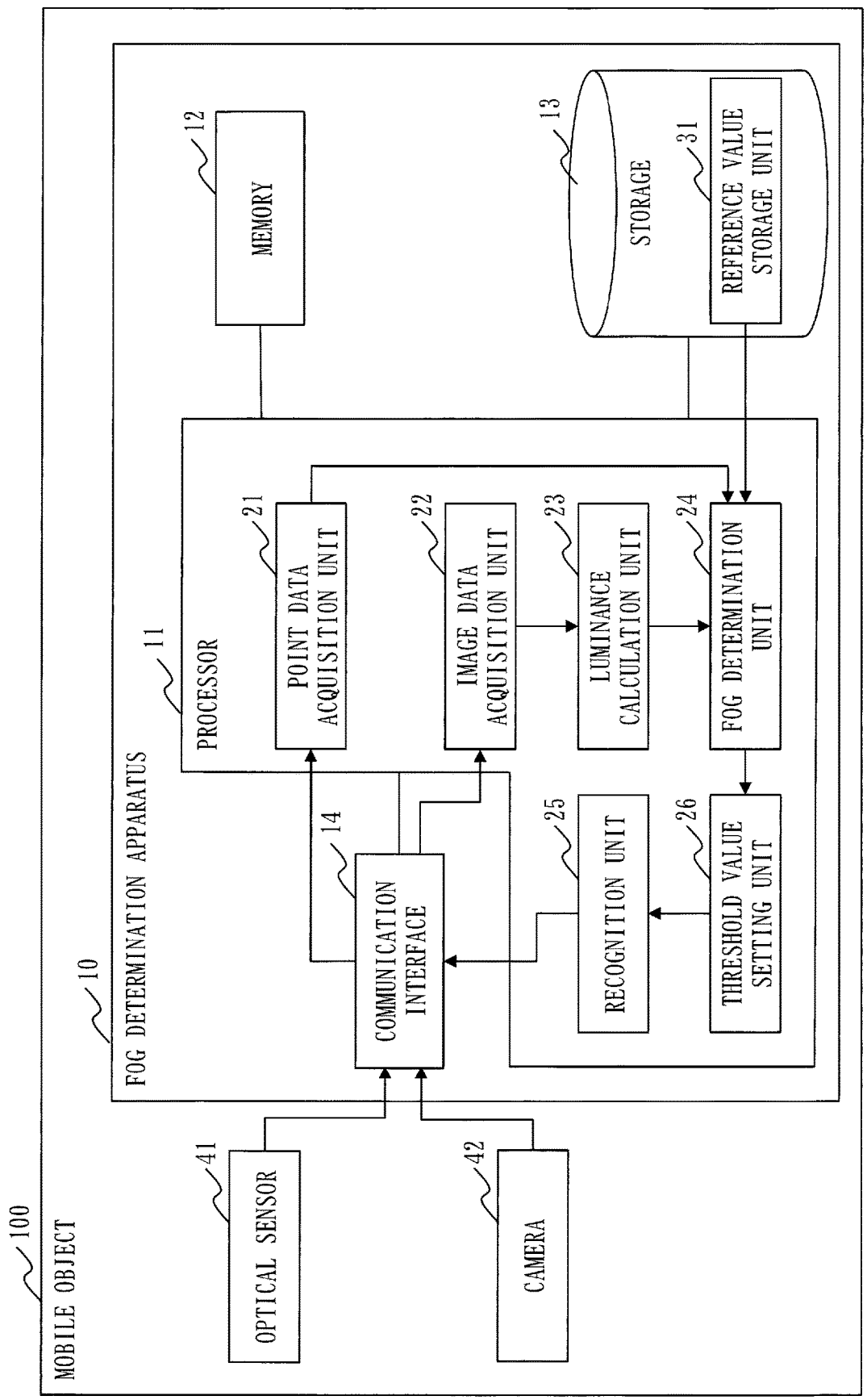
FIG. 8 is a configuration diagram of the fog determination apparatus 10 according to a second embodiment.

Referring to FIG. 8, a configuration of the fog determination apparatus 10 according to the second embodiment will be described.

The fog determination apparatus 10 differs from that of the first embodiment in that a recognition unit 25 and a threshold value setting unit 26 are included.

\*\*\*Description of Operation\*\*\*

Figure 9:
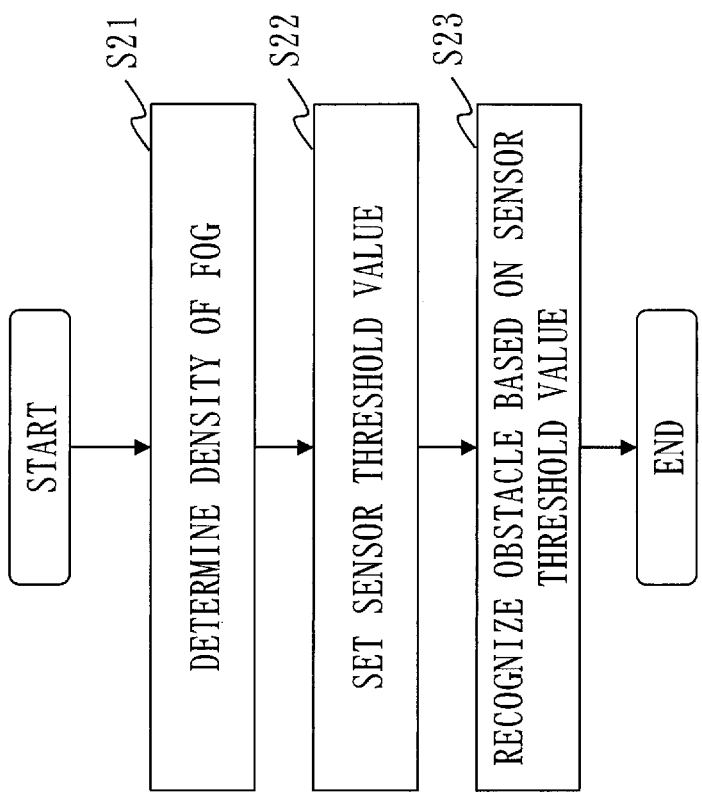
FIG. 9 is a flowchart illustrating overall operation of the fog determination apparatus 10 according to the second embodiment.
Figure 10:
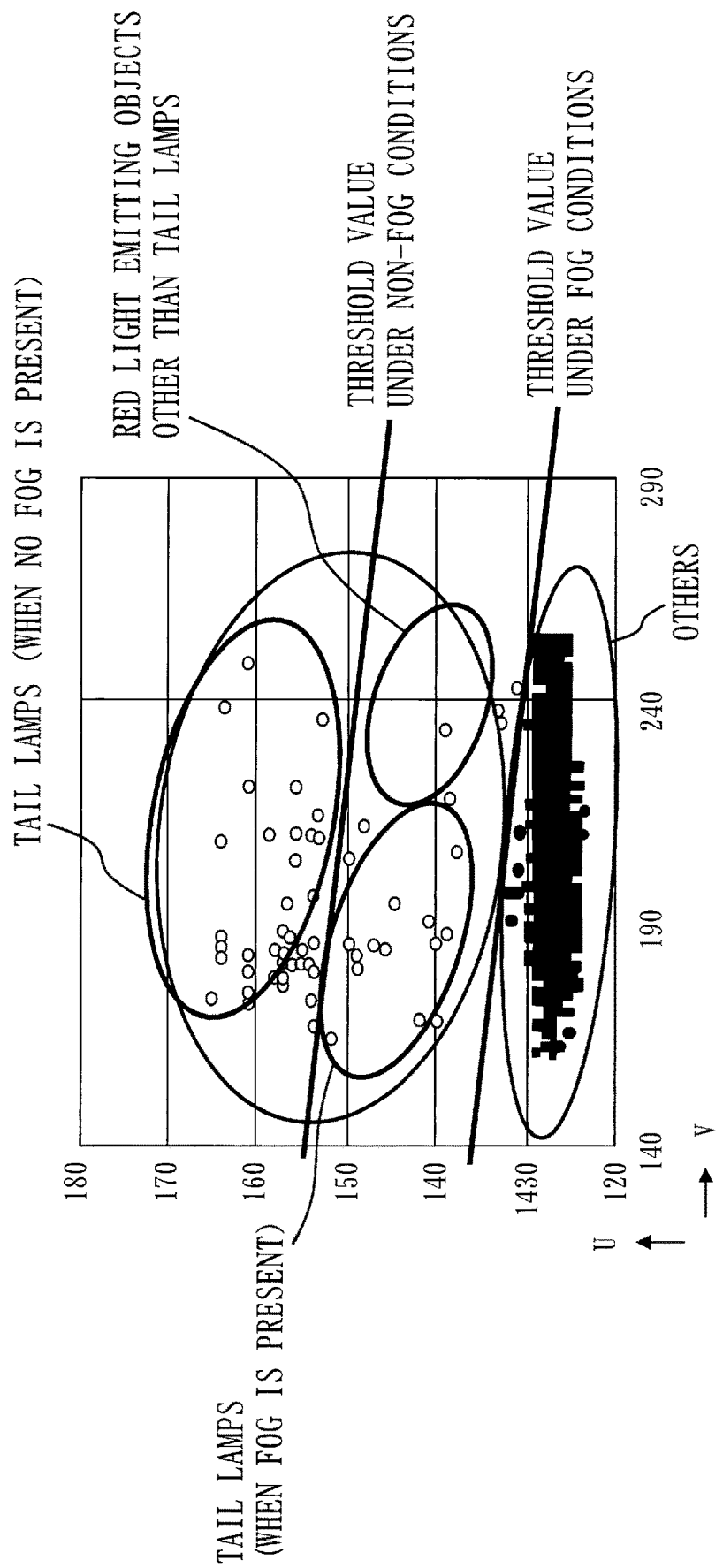
FIG. 10 is a diagram describing a threshold value setting process according to the second embodiment.

Referring to FIGS. 9 and 10, operation of the fog determination apparatus 10 according to the second embodiment will be described.

The operation of the fog determination apparatus 10 according to the second embodiment corresponds to a fog determination method according to the second embodiment. The operation of the fog determination apparatus 10 according to the second embodiment also corresponds to processes of a fog determination program according to the second embodiment.

Referring to FIG. 9, the overall operation of the fog determination apparatus 10 according to the second embodiment will be described.

Step S21 is the process to determine the density of fog described in the first embodiment.

(Step S22: Threshold Value Setting Process)

The threshold value setting unit 26 sets the sensor threshold value of the sensor for identifying an obstacle depending on the density of fog determined in step S21.

Referring to FIG. 10, a specific example will be described.

FIG. 10 illustrates a case in which a camera is used as the sensor and tail lamps of a vehicle are identified.

When tail lamps are identified using the camera, a boundary line that linearly distinguishes tail lamps and others is used as the sensor threshold value on a UV plane of YUV data. Thus, the threshold value setting unit 26 sets this boundary line depending on the density of fog. The boundary line can be expressed as $V = a \cdot U + b$. Thus, the threshold value setting unit 26 sets the values of a and b depending on the density of fog.

As illustrated in FIG. 10, when no fog is present, the threshold value setting unit 26 sets the boundary line, which is the sensor threshold value, to a higher value in order to prevent red light emitting objects other than tail lamps from being mistakenly recognized as tail lamps. When fog is present, the threshold value setting unit 26 sets the boundary line, which is the sensor threshold value, to a lower value in order to facilitate recognition of red light emitting objects as tail lamps.

Note that FIG. 10 illustrates an example of setting the sensor threshold value for two cases, one in which fog is present and one in which no fog is present. However, the threshold value setting unit 26 may set the sensor threshold value for each of a plurality of levels of density of fog. In this case, the boundary line, which is the sensor threshold value, is set to a lower value as the density of fog is greater.

(Step S23: Recognition Process)

The recognition unit 25 recognizes an obstacle, using the sensor threshold value set in step S22.

In the example in FIG. 10, the recognition unit 25 detects tail lamps in the image data obtained by the camera, using the boundary line set in step S22.

Effects of Second Embodiment

As described above, the fog determination apparatus 10 according to the second embodiment sets the sensor threshold value depending on the density of fog. This allows an obstacle to be appropriately recognized.

Third Embodiment

A third embodiment differs from the first and second embodiments in that a sensor to be used for identifying an obstacle is decided depending on the density of fog. In the third embodiment, this difference will be described, and description of the same portions will be omitted.

Note that an example in which a function is added to the first embodiment will be described here. However, the function may also be added to the second embodiment.

*Description of Configuration*

Figure 11:
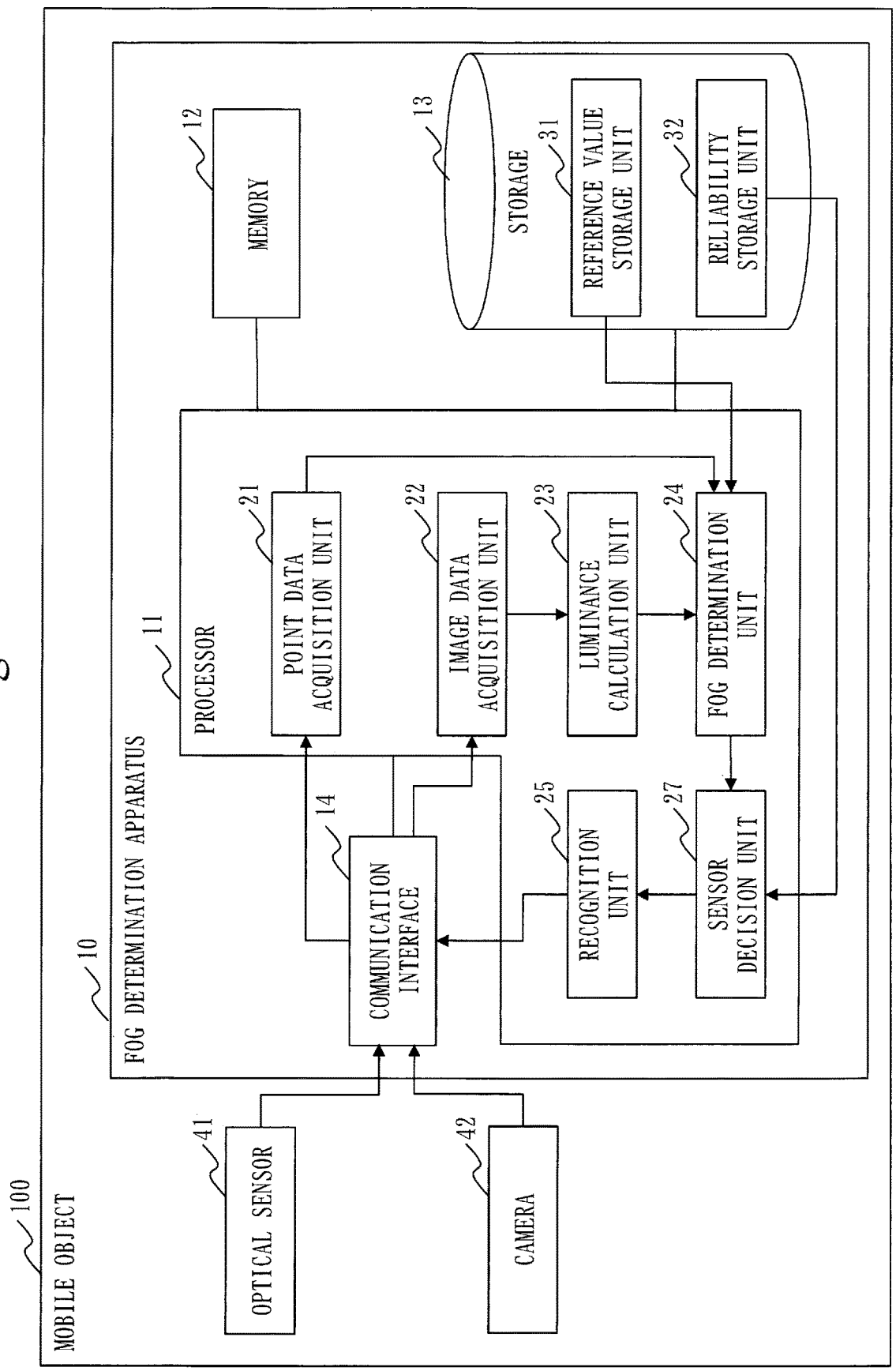
FIG. 11 is a configuration diagram of the fog determination apparatus 10 according to a third embodiment.

Referring to FIG. 11, a configuration of the fog determination apparatus 10 according to the third embodiment will be described.

The fog determination apparatus 10 differs from that of the first embodiment in that the recognition unit 25 and a sensor decision unit 27 are included. Another difference from the first embodiment is that the storage 13 realizes the function of a reliability storage unit 32.

*Description of Operation*

Figure 12:
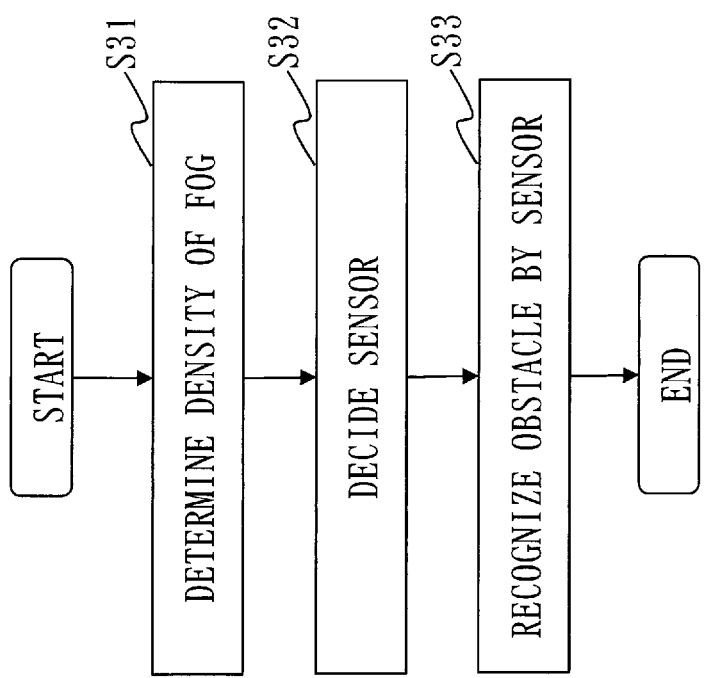
FIG. 12 is a flowchart illustrating overall operation of the fog determination apparatus 10 according to the third embodiment.
Figure 13:
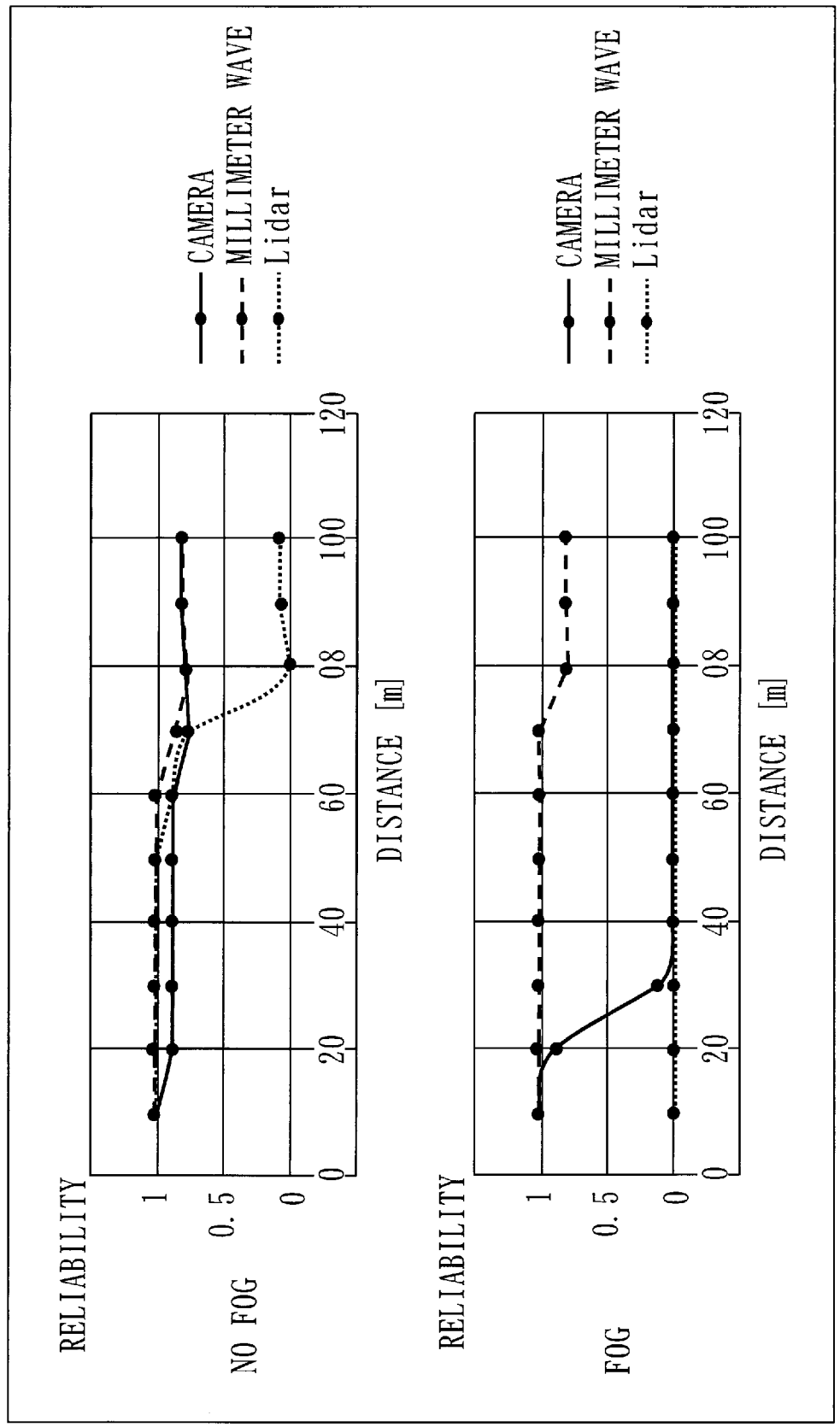
FIG. 13 is a diagram describing information to be stored in a reliability storage unit 32 according to the third embodiment.

Referring to FIGS. 12 and 13, operation of the fog determination apparatus 10 according to the third embodiment will be described.

The operation of the fog determination apparatus 10 according to the third embodiment corresponds to a fog determination method according to the third embodiment. The operation of the fog determination apparatus 10 according to the third embodiment also corresponds to processes of a fog determination program according to the third embodiment.

Referring to FIG. 12, the overall operation of the fog determination apparatus 10 according to the third embodiment will be described.

Step S31 is the process to determine the density of fog described in the first embodiment.

(Step S32: Sensor Decision Process)

The sensor decision unit 27 decides the sensor to be used for identifying an obstacle depending on the density of fog determined in step S31.

Specifically, the reliability storage unit 32 stores reliabilities depending on the distance, separately for each level of density of fog and for each sensor mounted on the mobile object 100. As illustrated in FIG. 13, when a camera, a millimeter wave radar, and a LiDAR are mounted on the mobile object 100 as sensors, the reliability storage unit 32 stores reliabilities depending on the distance for each of the camera, the millimeter wave radar, and the LiDAR, separately for each level of density of fog. FIG. 13 illustrates reliabilities depending on the distance in a case in which fog is present and a case in which no fog is present. The reliabilities for each of the sensors are obtained empirically.

The sensor decision unit 27 refers to the reliability storage unit 32, and decides, as the sensor to be used for identifying an obstacle, a sensor having a high reliability in the case of the density of fog determined in step S31. The sensor decision unit 27 may decide the sensor to be used for identifying an obstacle separately for each length of the distance.

For example, the sensor decision unit 27 decides to use the LiDAR and the camera when no fog is present, and decides to use the millimeter wave radar and the camera when fog is present.

(Step S33: Recognition Process)

The recognition unit 25 recognizes an obstacle, using the sensor decided in step S32.

Effects of Third Embodiment

As described above, the fog determination apparatus 10 according to the third embodiment decides the sensor to be used for identifying an object depending on the density of fog. This allows an obstacle to be appropriately recognized.

*Other Configuration*

<Fifth Variation>

In the third embodiment, the function is added to the first embodiment. However, the function may also be added to the second embodiment.

Figure 14:
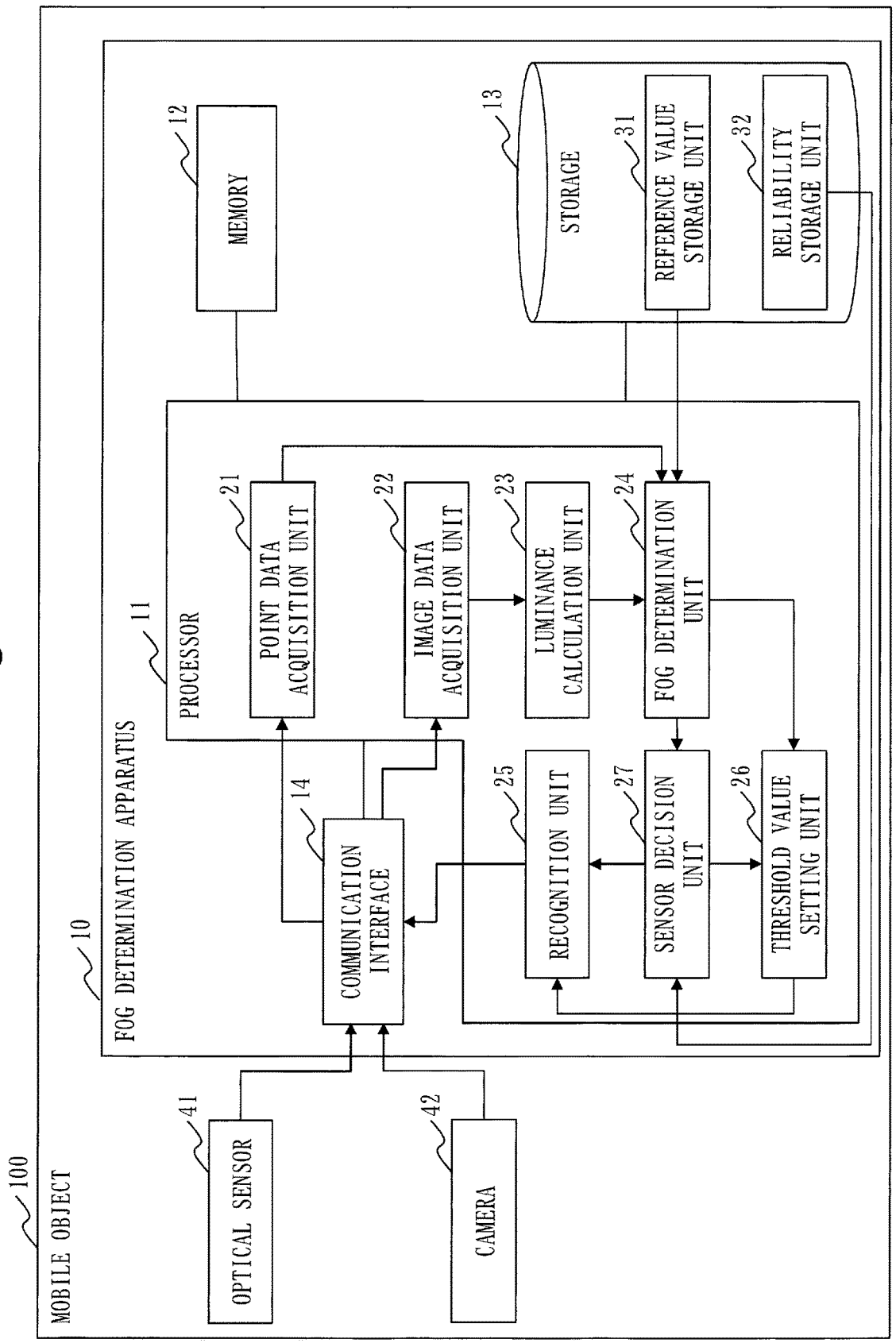
FIG. 14 is a configuration diagram of the fog determination apparatus 10 according to a fifth variation.
Figure 15:
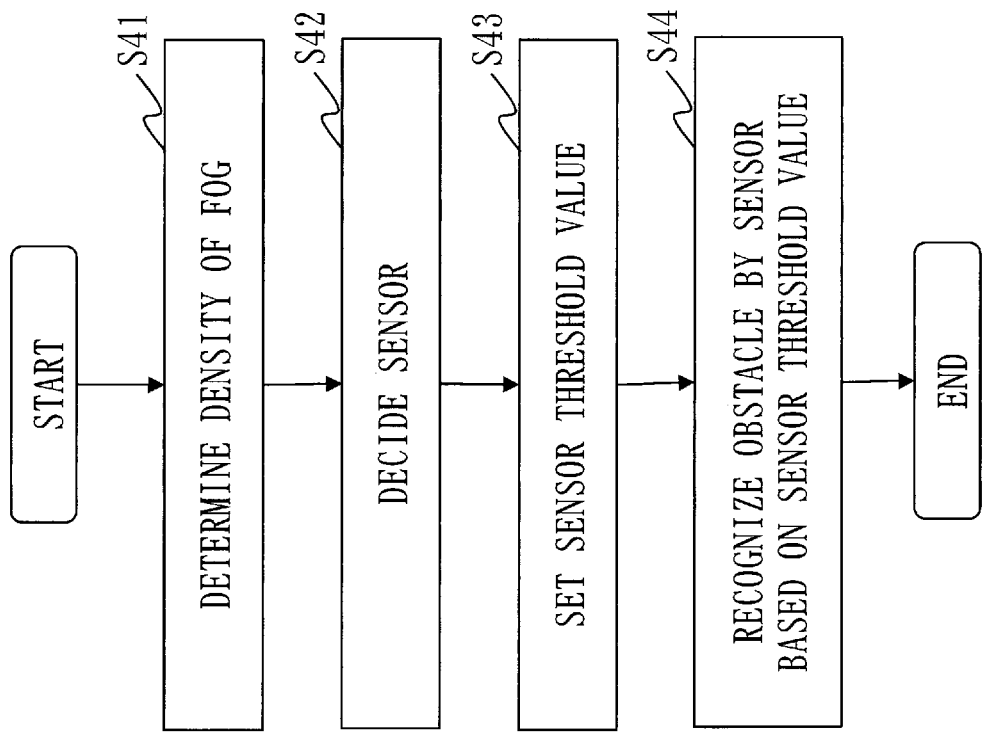
FIG. 15 is a flowchart illustrating overall operation of the fog determination apparatus 10 according to the fifth variation.

In this case, as illustrated in FIG. 14, the fog determination apparatus 10 includes the threshold value setting unit 26 in addition to the functional components illustrated in FIG. 11. As illustrated in FIG. 15, in step S42 the sensor decision unit 27 decides the sensor to be used, and then in step S43 the threshold value setting unit 26 decides the sensor threshold value for the decided sensor.

Note that the processes of steps S41, S42, and S44 are the same as the processes of steps S31, S32, and S33 in FIG. 12. Also note that the process of step S43 is the same as the process of step S22 in FIG. 9.

The embodiments and variations of the present invention have been described above. Any ones of these embodiments and variations may be implemented in combination. Alternatively, any one or ones of these embodiments and variations may be partially implemented. Note that the present invention is not limited to the above embodiments and variations, and various modifications can be made as necessary.

REFERENCE SIGNS LIST

10: fog determination apparatus, 11: processor, 12: memory, 13: storage, 14: communication interface, 15: electronic circuit, 21: point data acquisition unit, 22: image data acquisition unit, 23: luminance calculation unit, 24: fog determination unit, 25: recognition unit, 26: threshold value setting unit, 27: sensor decision unit, 31: reference value storage unit, 41: optical sensor, 42: camera, 100: mobile object

The invention claimed is:

1. A fog determination apparatus comprising:
processing circuitry to:
acquire point data indicating a reflection point obtained by an optical sensor that receives reflected light of an emitted light beam reflected at the reflection point;
acquire image data of an area around the reflection point indicated by the acquired point data;
calculate, as a value indicating smoothness of luminance of the image data, a sum of absolute values of values resulting from calculating a second derivative of luminance of each pixel constituting one or more horizontal lines of the acquired image data; and
determine a density of fog based on a distance, which is determined from the point data, from the optical sensor to the reflection point and the calculated smoothness of the luminance.

2. The fog determination apparatus according to claim 1, wherein
the processing circuitry determines presence of fog based on a reference value having an inverse relationship to distance, such that, depending on the reference value, the processing circuitry determines a high density of fog even when the smoothness of the luminance is low.

3. The fog determination apparatus according to claim 1, wherein the processing circuitry sets a sensor threshold value of a sensor for identifying an obstacle, depending on the determined density of fog.

4. The fog determination apparatus according to claim 2, wherein the processing circuitry sets a sensor threshold value of a sensor for identifying an obstacle, depending on the determined density of fog.

5. The fog determination apparatus according to claim 1, wherein the processing circuitry decides a sensor to be used for identifying an obstacle, depending on the determined density of fog.

6. The fog determination apparatus according to claim 2, wherein the processing circuitry decides a sensor to be used for identifying an obstacle, depending on the determined density of fog.

7. The fog determination apparatus according to claim 3, wherein the processing circuitry decides a sensor to be used for identifying an obstacle, depending on the determined density of fog.

8. The fog determination apparatus according to claim 4, wherein the processing circuitry decides a sensor to be used for identifying an obstacle, depending on the determined density of fog.

9. A fog determination method comprising:
acquiring point data indicating a reflection point obtained by an optical sensor that receives reflected light of an emitted light beam reflected at the reflection point;
acquiring image data of an area around the reflection point indicated by the point data;
calculating, as a value indicating smoothness of luminance of the image data, a sum of absolute values of values resulting from calculating a second derivative of luminance of each pixel constituting one or more horizontal lines of the image data; and
determining a density of fog based on a distance, which is determined from the point data, from the optical sensor to the reflection point and the smoothness of the luminance.

10. A non-transitory computer readable medium storing a fog determination program for causing a computer to execute:
a point data acquisition process to acquire point data indicating a reflection point obtained by an optical sensor that receives reflected light of an emitted light beam reflected at the reflection point;
an image data acquisition process to acquire image data of an area around the reflection point indicated by the point data acquired by the point data acquisition process;
a luminance calculation process to calculate, as a value indicating smoothness of luminance of the image data, a sum of absolute values of values resulting from calculating a second derivative of luminance of each pixel constituting one or more horizontal lines of the image data acquired by the image data acquisition process; and
a fog determination process to determine a density of fog based on a distance, which is determined from the point data, from the optical sensor to the reflection point and the smoothness of the luminance calculated by the luminance calculation process.

* * * * *